United States Patent
Li et al.

(10) Patent No.: US 8,023,152 B2
(45) Date of Patent: Sep. 20, 2011

(54) METHOD FOR FREQUENCY-MODULATION SCREENING USING ERROR DIFFUSION BASED ON DUAL-FEEDBACK

(75) Inventors: Haifeng Li, Beijing (CN); Bin Yang, Beijing (CN); Shixiong Ma, Beijing (CN)

(73) Assignees: Peking University Founder Group Co., Ltd., Beijing (CN); Beijing Founder Electronics Co., Ltd., Beijing (CN); Peking Univeristy, Beijing (CN)

( * ) Notice: Subject to any disclaimer, the term of this patent is extended or adjusted under 35 U.S.C. 154(b) by 814 days.

(21) Appl. No.: 11/912,846

(22) PCT Filed: Nov. 2, 2005

(86) PCT No.: PCT/CN2005/001826
§ 371 (c)(1),
(2), (4) Date: Mar. 18, 2008

(87) PCT Pub. No.: WO2006/114031
PCT Pub. Date: Nov. 2, 2006

(65) Prior Publication Data
US 2008/0170267 A1    Jul. 17, 2008

(30) Foreign Application Priority Data
Apr. 27, 2005   (CN) .......................... 2005 1 0068127

(51) Int. Cl.
*H04N 1/405* (2006.01)
(52) U.S. Cl. .................................. 358/3.03; 382/237
(58) Field of Classification Search ............ 358/1.9, 358/2.1, 3.03–3.06, 3.13–3.14, 3.22–3.24, 358/465–466, 447; 382/237
See application file for complete search history.

(56) References Cited

U.S. PATENT DOCUMENTS
5,912,744 A *   6/1999   Nakane ..................... 358/447
(Continued)

FOREIGN PATENT DOCUMENTS
CN           1424694          6/2003
(Continued)

OTHER PUBLICATIONS

Niranjan Damera-Venkata et al., "Adaptive Threshold Modulation for Error Diffusion Halftoning", IEEE Transactions on Image Processing, Vol. 10, No. 1, Jan. 2001, pp. 104-116.

(Continued)

*Primary Examiner* — Thomas D Lee
*Assistant Examiner* — Stephen M Brinich
(74) *Attorney, Agent, or Firm* — The Webb Law Firm

(57) ABSTRACT

The present invention relates to a method for producing halftone dots in the field of image hard copying, more particularly to a method for frequency-modulation screening using error diffusion based on dual-feedback. In the known frequency-modulation and amplitude-modulation screening technology, it is hard to output a halftone image with high quality using an output equipment with a low resolution (600 dpi) and the satisfactory effect of representing the gradations of the original image in detail and holding the smoothness of the original image can not be achieved. By using the dual-feedback technology based on a basic algorithm of the error distribution, the method in the present invention realizes the organic combination of the conventional frequency-modulation and amplitude-modulation screens and achieves the effect of mixed screening. The method in the present invention can effectively solve the problem of losing gradations of dots in an output equipment with low resolution and can reduce the moire caused by the random distribution characteristic so as to output halftone images with high quality and full gradations.

7 Claims, 3 Drawing Sheets

U.S. PATENT DOCUMENTS

| | | | |
|---|---|---|---|
| 6,307,647 | B1 | 10/2001 | Cheung et al. |
| 6,977,756 | B2 * | 12/2005 | Nakano et al. ............... 358/3.03 |
| 2004/0190071 | A1 | 9/2004 | Thakur |
| 2005/0083554 | A1 | 4/2005 | Tresser |

FOREIGN PATENT DOCUMENTS

| | | |
|---|---|---|
| EP | 0606132 A2 | 7/1994 |
| EP | 1416714 A1 | 5/2004 |
| JP | 04051773 | 2/1992 |
| JP | 07007619 | 1/1995 |

OTHER PUBLICATIONS

Levien, "Output Dependent Feedback in Error Diffusion Halftoning", IS&T's Annual Conference, May 1, 1993, vol. 46, pp. 115-118, XP008067151.

Eschbach et al., "Threshold Modulation and Stability in Error Diffusion", IEEE Signal Processing Magazine, Jul. 1, 2003, pp. 39-50, vol. 20, No. 4, IEEE Service Center, Piscataway, NJ, US., XP011098880.

Damera-Venkata et al., "Adaptive Threshold Modulation for Error Diffusion Halftoning", IEEE Transactions on Image Processing, Jan. 1, 2001, pp. 104-116, IEEE Service Center, Piscataway, NJ, US., XP000998885.

Paul A. Delabasita et al., "Screening Techniques, Moire in Four Color Printing", TAGA Conference, Vancouver B. C., Apr. 1992, pp. 44-65.

Thrasyvoulos N. Pappas et al., "Printer Models and Error Diffusion", IEEE Transactions on Image Processing, Jan. 1995, pp. 66-80, vol. 4, No. 1.

* cited by examiner

METHOD FOR FREQUENCY-MODULATION SCREENING USING ERROR DIFFUSION BASED ON DUAL-FEEDBACK

FIELD OF THE INVENTION

The present invention relates to a method for producing halftone dots in the field of image hard copying, more particularly to a method for frequency-modulation screening using error diffusion based on dual-feedback.

BACKGROUND OF THE INVENTION

The image hard copying generally relates to the screening and plate-making technology of printers and advanced printing and plate-making equipments. The screening technology used for image hard copying is also called the technology of digital image halftone. The technology of digital image halftone comprises amplitude-modulation screening and frequency-modulation screening. The technology of amplitude-modulation screening is also called ordered dithering of gathered dots, characterizing in that produced colored dots in a halftone image are pairwise gathered geometrically so as to form clusters of colored regions called dots. Since the technology is to control the area of the dots to represent the gray level of the original image, the dots is called amplitude-modulation dots.

On the other hand, the frequency-modulation halftone image avoids the geometrical gather of the colored dots in the process of production of the image. The technology represents the gray level of the original image by controlling the number of the colored dots in a unit area. Since the colored dots in the frequency-modulation halftone image are not distributed in the form of gathering, different gray levels in the original image are corresponding to different average distances among the dots. According to the view of digital image processing, the frequency of the image is variable. Thus, the technology is called frequency-modulation screening.

In the field of printing, the technologies of amplitude-modulation and frequency-modulation have respective advantages and disadvantages for the process of image hard copying. Since the amplitude-modulation dots have certain dimensions (i.e. the halftone count) and specific regular angles (i.e. the halftone angle) for arrangement of the dots, the represented tone of the image is very regular during the practical process of a halftone image, without generating any texture. Thus, the object bearing the printed content looks "clear". However, in the practical process, when halftone images with different angles and slightly different counts are overlapped, the optical interference phenomenon is generally generated due to the characteristics of the counts and angles. The phenomenon is called "moire" in the printing field. Furthermore, the amplitude-modulation halftone dots also have the characteristic of shape of the dots. Therefore, the shape of the dots will be changed with the change of the size of the dots during the change of continuous tone gradations so as to generate a phenomenon of jump and loss of the continuous tone gradations. The familiar "moire" and phenomenon of jump of gradations should be avoided or inhibited in practical use so that the process is needed to be improved. The conventional amplitude-modulation screening is disclosed in a reference: Screen Techniques: Moire in Four Color Printing, Paul A. Delabastita, TAGA Proceedings, 1992, 1:44-66.

To the contrary, the size of the frequency-modulation halftone dots is changeless (the size generally equals to that of a pixel of the output equipment and the count does not exist) and the distribution of the dots has the characteristic of random dithering (the angle does not exist). Therefore, the "moire" and jump of gradations in the amplitude-modulation dots are avoided completely. However, other problems occur due to the characteristic of distribution of random dots. Since the distribution of the frequency-modulation halftone dots is random absolutely and sharpens the image, the texture due to the random effect generally occurs in those medium gradations of the continuous tone image and "worm" texture generally occurs in light and deep gradations. The texture is hard to be avoided because of the random characteristic. Furthermore, the size of the frequency-modulation halftone dots generally equals to that of a single dot of a physical equipment. Thus, some of the dots are generally lost if the status of the physical output equipment is not good. Further, frequency-modulation screening generally loses gradations especially in the light and deep gradations during the process so that the image cannot be represented with high quality. The conventional error distribution algorithm is disclosed in a reference: Printer Models and Error Diffusion, T. N. Pappas and D. L. Neuho, IEEE Transactions on Image Processing, vol. 4, pp. 66-79, January 1995.

In the field of printing and plate-making, the output equipment used for image hard copying is generally a laser phototypesetting machine, a laser printer, a laser inkjet printer, and the like. Since the two types of halftone dots are limited by the process, the amplitude-modulation dots is mostly used in the field of laser phototypesetting with back-end printing and the frequency-modulation dots is mostly used for equipments in the field of desktop office such as a laser printer, an inkjet printer, and the like. As a whole, the application scope of the frequency-modulation halftone dots is not wider than that of the amplitude-modulation halftone dots because the size of the frequency-modulation halftone dots is changeless and too small. Thus, if the precision of the physical output equipment and the adsorbability of the ink and the object bearing the printed content are not satisfied requirements, the effect of the represented image produced by the frequency-modulation halftone dots is far away from that produced by the amplitude-modulation halftone dots. The reason is that the size of the amplitude-modulation halftone dots is changed in different gradations so as to ensure enough ink is adsorbed on the object bearing the printed content.

Although the effect of the frequency-modulation halftone dots based on the error distribution technology is better than that of amplitude-modulation halftone dots in detail. However, the application of the amplitude-modulation halftone dots is limited because of the above-mentioned disadvantages and it should be improved.

SUMMARY OF THE INVENTION

To overcome the shortcomings of the prior art, the present invention is to provide a method for frequency-modulation screening using error diffusion based on dual-feedback. The method can effectively solve the problem of losing gradations of dots in an output equipment with low resolution and can reduce the moire caused by the random distribution characteristic so as to output halftone images with high quality and full gradations.

In order to accomplish the above object, the present invention provides a method for frequency-modulation screening using error diffusion based on dual-feedback, comprising:

(1) implementing an operation T for comparing with a threshold to a final input value g"(m, n) of a pixel of an original image, wherein a result of the operation is converted to a corresponding value b(m, n) of the pixel of a halftone image; wherein the step (1) uses a process for bidirectional scanning when the original image is scanned, for each of continuously scanned rows in the original image, one row is scanned from left to right, a next row is subsequently scanned from right to left, and a rest is deduced by analogy until all of the rows are scanned completely;

(2) comparing the value b(m, n) of the pixel with a input value g'(m, n) of the pixel, which is to be used for obtaining the threshold, and calculating a difference between the value b(m, n) and the value g'(m, n), wherein the difference is an error value e(m, n);

(3) multiplying the error value e(m, n) and a preset weight distribution coefficient together by using an error diffusion filter e and then diffusing a result after multiplying to unprocessed pixels around a current pixel, wherein a diffused error value to a pixel is weightedly added to an value g(m, n) of the pixel of the original image on a position receiving diffusion to obtain a new input value g'(m, n) of the pixel of the original image;

wherein the error diffusion filter e in the step (3) uses the following principle of diffusion and weight distribution mode:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the position of the current pixel, each of the arithmetic ratios in other positions represents the diffusion weight coefficient relative to the current pixel, and the diffusion weight coefficients belong to [0, 1] and satisfy the following expression:

$2d_1+4d_2+2d_3+2d_4+2d_5 \in [0,1]$;

(4) diffusing processed results to surrounding corresponding unprocessed pixels, and weightedly adding each of the diffused results and each of parameters of error diffusion in the steps (2) and (3) to the input value g(m, n) of the pixel of the original image to obtain the final input value g"(m, n) of the pixel, wherein the processed results are obtained by implementing a multiplying operation in view of the output value b(m, n) of the current processed pixel using a diffusion filter w and processing results of the multiplying operation with a dithering algorithm, and the step (4) is a parallel operation of the steps (2) and (3);

wherein a diffusion mode of the diffusion filter w in the step (4) is set as:

|       | **    | $w_0$ |
|-------|-------|-------|
| $w_3$ | $w_2$ | $w_1$ | wherein, a scanning direction is from left to right, ** represents the position of the current pixel, each of the parameters in other positions represents the diffusion weight coefficient relative to the current pixel, and the parameters belong to [0, 1] and satisfy the following expression:

$w_{sum}=(w_0+w_1+w_2+w_3) \in [0,1]$;

wherein the dithering algorithm for the diffusion filter w uses the following processes:

$f\text{Rand}=(R(m,n)/R\_\text{MAX}-0.5) \times c\text{Dither}$ $dw_0=w_0-f\text{Rand}$ $dw_2=w_2+f\text{Rand}$ $dw_1=w_1+f\text{Rand}$ $dw_3=w_3-f\text{Rand}$ [Formula 1]

wherein, fRand is a parameter for fine adjusting dithering; R(m, n) is a parameter with random value for scanning a current dot; R_MAX is a maximum of a random parameter R(i); cDither is a parameter for adjusting amplitude of dithering and determines the performance of amplitude-modulation; and $dw_0$~$dw_3$ are the diffusion weight coefficients of the diffusion filter w in different directions after dithering;

(5) repeating the steps (1)-(4) until the input values g(m, n) of all pixels are processed.

The present invention has the following effects. According to the method of the present invention, medium frequencies can be introduced between the high and low frequencies on the basis of the original frequency-modulation halftone dots using error diffusion. Therefore, relative characteristics of the amplitude-modulation halftone dots except the characteristic of the screen angle can be achieved in frequency-modulation halftone dots and the halftone dots can have both of frequency-modulation and amplitude-modulation characteristics so as to obtain an output effect of mixed screening of the two types of halftone dots. Thus, the method can effectively solve the problem of losing gradations of dots in an output equipment with low resolution and can reduce the moire caused by the random distribution characteristic so as to output halftone images with high quality and full gradations.

The present invention has the effects mentioned above because the weight distribution in the diffusion direction in the step (4) will influence illumination probabilities of surrounding pixels caused by error diffusion in the steps (2) and (3) so as to improve the original effect of the error diffusion and gather the surrounding pixels. The size of the frequency-modulation halftone dots can be different in different gradations so as to achieve amplitude-modulation characteristic. Furthermore, the diffusion directions and diffusion parameters in the step (4) can influence the size of the dots having amplitude-modulation characteristic in a frequency-modulation screen directly. By adjusting the diffusion directions and diffusion parameters, the size of the dots having amplitude-modulation characteristic can be changed so that the frequency-modulation screen has characteristics similar to that of the amplitude-modulation screen.

DESCRIPTION OF THE PREFERRED EMBODIMENTS

Hereinafter, a detailed description of the present invention will be given with reference to the appended drawings and embodiments.

To accomplish the above object, the present invention uses a dual-feedback mechanism based on the known frequency-modulation screening method using error diffusion. An embodiment of the present invention comprises the following steps.

Figure 1:
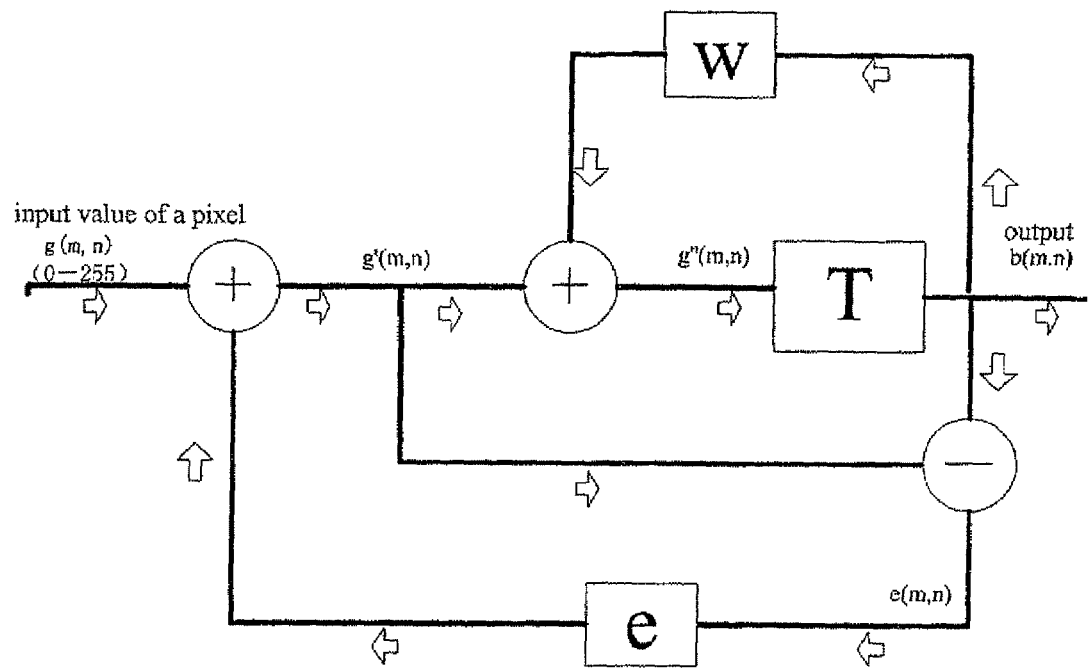
FIG. 1 is a diagram illustrating the principle of dual-feedback for the error diffusion in a frequency-modulation screen.

As shown in FIG. 1, the present invention uses a method of diffusion in a plurality of directions.

Step 1 is to scan and input the original image and preliminarily process the original image to obtain a final input value g"(>, n) of a pixel. In view of the final input value g"(m, n), an operation T of a threshold comparison is carried out. The result of the operation is convened to the corresponding value b(m, n) of the pixel of the halftone image.

Figure 2:
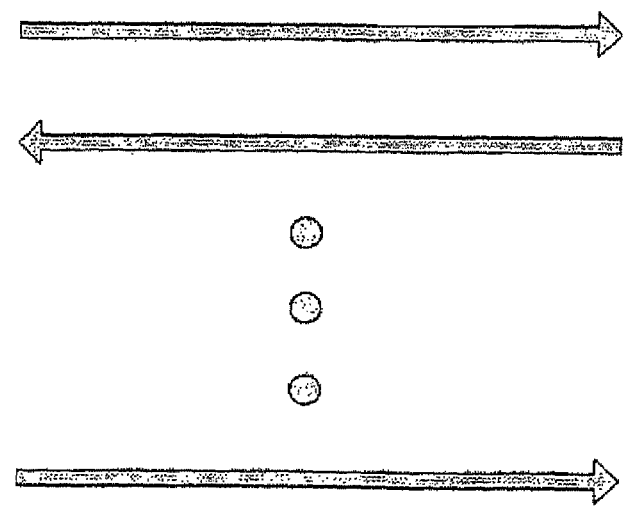
FIG. 2 is a schematic diagram illustrating the directions of inputting data by scanning.

In order to avoid the interference phenomenon caused by the scanning direction and the frequency of the dots with random distribution (popularly called "Moire"), the embodiment uses a bidirectional scanning method for scanning the data of the original pixels, as shown in FIG. 2.

Step 2 is to compare the value b(m, n) of the pixel with the input value g'(m, n) of the same pixel (the input value is used for obtaining the threshold) to obtain the difference between b(m, n) and g'(m, n), i.e. an error value e(m, n).

Step 3 is to multiply the error value e(m, n) by a preset weight distribution coefficient through an error diffusion filter e and then diffuse the result to those unprocessed pixels around the current pixel. The diffused error value to a pixel is weightedly added to the value g(m, n) of the pixel of the original image to obtain a new input value g'(m, n) of the pixel. The error diffusion filter e uses the following principle of diffusion and weight distribution coefficients:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the position of the current pixel and each of the arithmetic ratios on the other positions represents the diffusion weight coefficient relative to the current pixel. In the embodiment, the coefficients are set as:

$d_1=1/44$, $d_2=2/44$, $d_3-5/44$, $d_4=4/44$, $d_5=8/44$.

The steps 2 and 3 accomplish the first diffusion feedback operation and implement the basic principle of error diffusion.

Step 4 which is a parallel operation of the steps 2 and 3 is to diffuse processed results to the surrounding corresponding unprocessed pixels and weightedly add each of the diffused results and each of the parameters of error diffusion in the steps 2 and 3 to the input value g(m, n) of the pixel of the original image to obtain a final input value g"(m, n) of the pixel, wherein the processed results are obtained by implementing a multiplying operation in view of the output value b(m, n) of the current processed pixel using a diffusion filter w and processing the results of the multiplying operation with the dithering algorithm. The diffusion mode of the diffusion filter w is set as:

|       | **    | $w_0$ |
|-------|-------|-------|
| $w_3$ | $w_2$ | $w_1$ | wherein, the scanning direction is from left to right, ** represents the position of the current pixel and each of the parameters on the other positions represents the diffusion weight coefficient relative to the current pixel. The parameters belong to [0, 1] and satisfy the following expression:

$w_{sum}=(w_0+w_1+w_2+w_3)\in[0,1]$.

The dithering algorithm uses the following Formula:

$f\text{Rand}=(R(m,n)/R\_MAX-0.5)\times c\text{Dither}$ $dw_0=w_0-f\text{Rand}$ $dw_2=w_2+f\text{Rand}$ $dw_1=w_1+f\text{Rand}$ $dw_3=w_3-f\text{Rand}$     [Formula 1]

In the Formula 1, fRand is a parameter for fine adjusting dithering; R(m, n) is a parameter with random value for scanning the current dot; R_X is the maximum of the random parameter R(i); cDither is a parameter for adjusting amplitude of dithering and determines the performance of amplitude-modulation; and $dw_0$~$dw_3$ are the diffusion weight coefficients of the diffusion filter w in different directions after dithering.

The step 4 accomplishes the second diffusion feedback operation and implements the amplitude-modulation characteristic of the frequency-modulation screen.

In the embodiment, the coefficients are set as:

$w_0=w_2=0.175$, $w_1=w_3=0.025$, then $w_{sum}=0.4$
cDither=0.2

During screening, the size of the frequency-modulation halftone dots is changed by adjusting $w_{sum}$ and the shape of the frequency-modulation halftone dots is controlled by adjusting the values of $w_0$~$w_3$.

Step 5 is to repeat steps 1-4 until the input values g(m, n) of all the pixels are processed.

Figure 3:
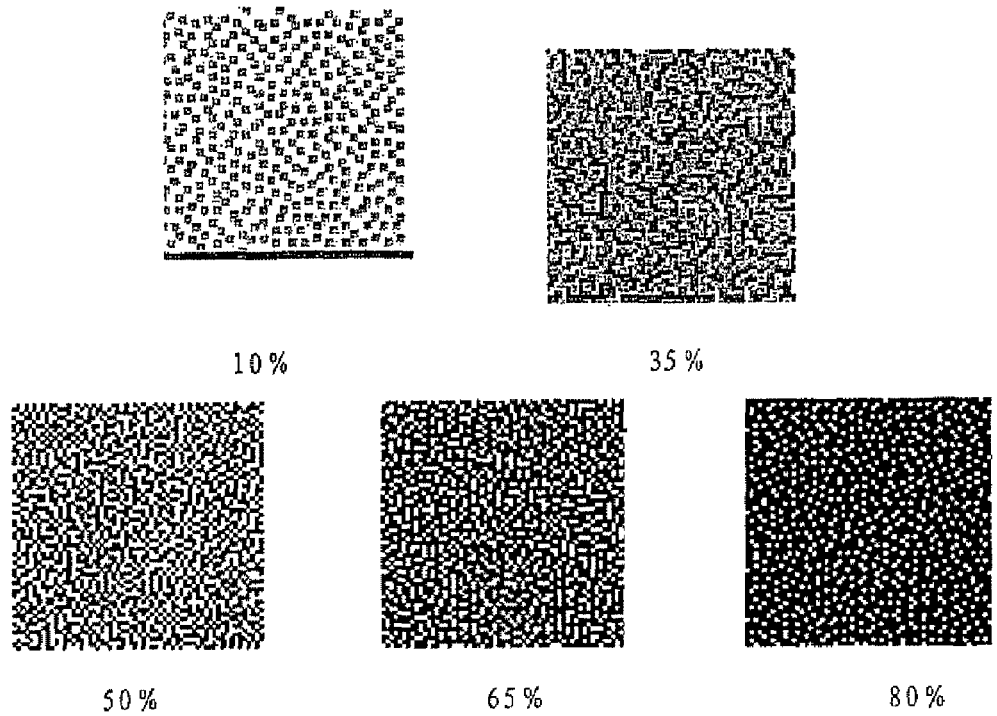
FIG. 3 is a schematic diagram illustrating arrays of frequency-modulation halftone dots after error diffusion based on single-feedback.
Figure 4:
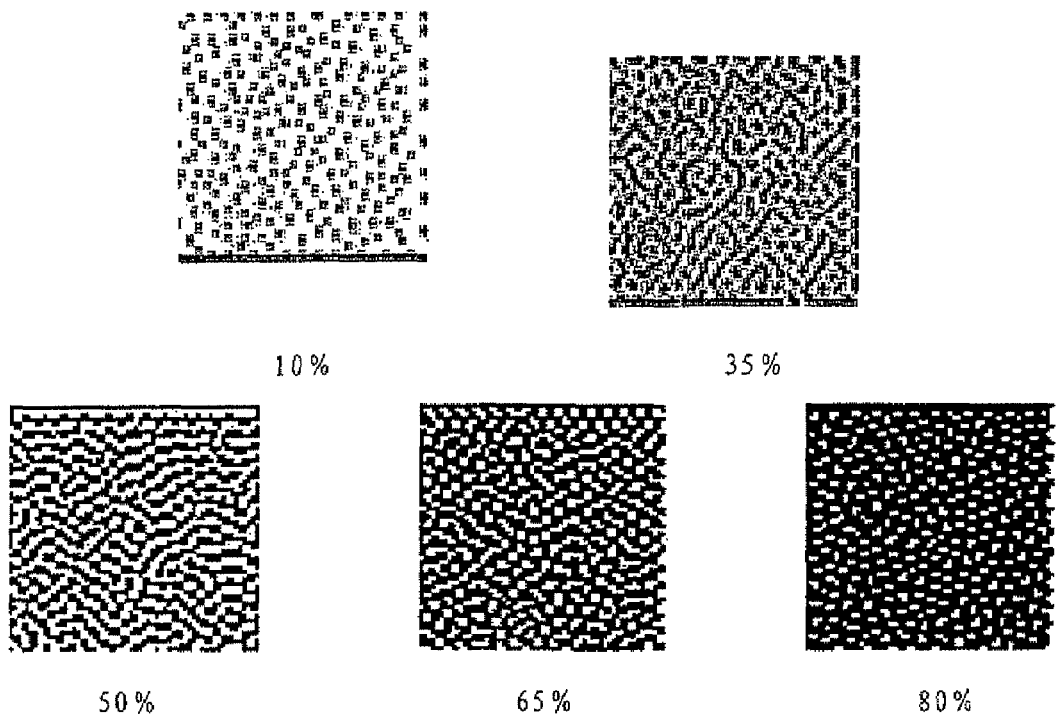
FIG. 4 is a schematic diagram illustrating arrays of frequency-modulation halftone dots after error diffusion based on dual-feedback.
Figure 5:
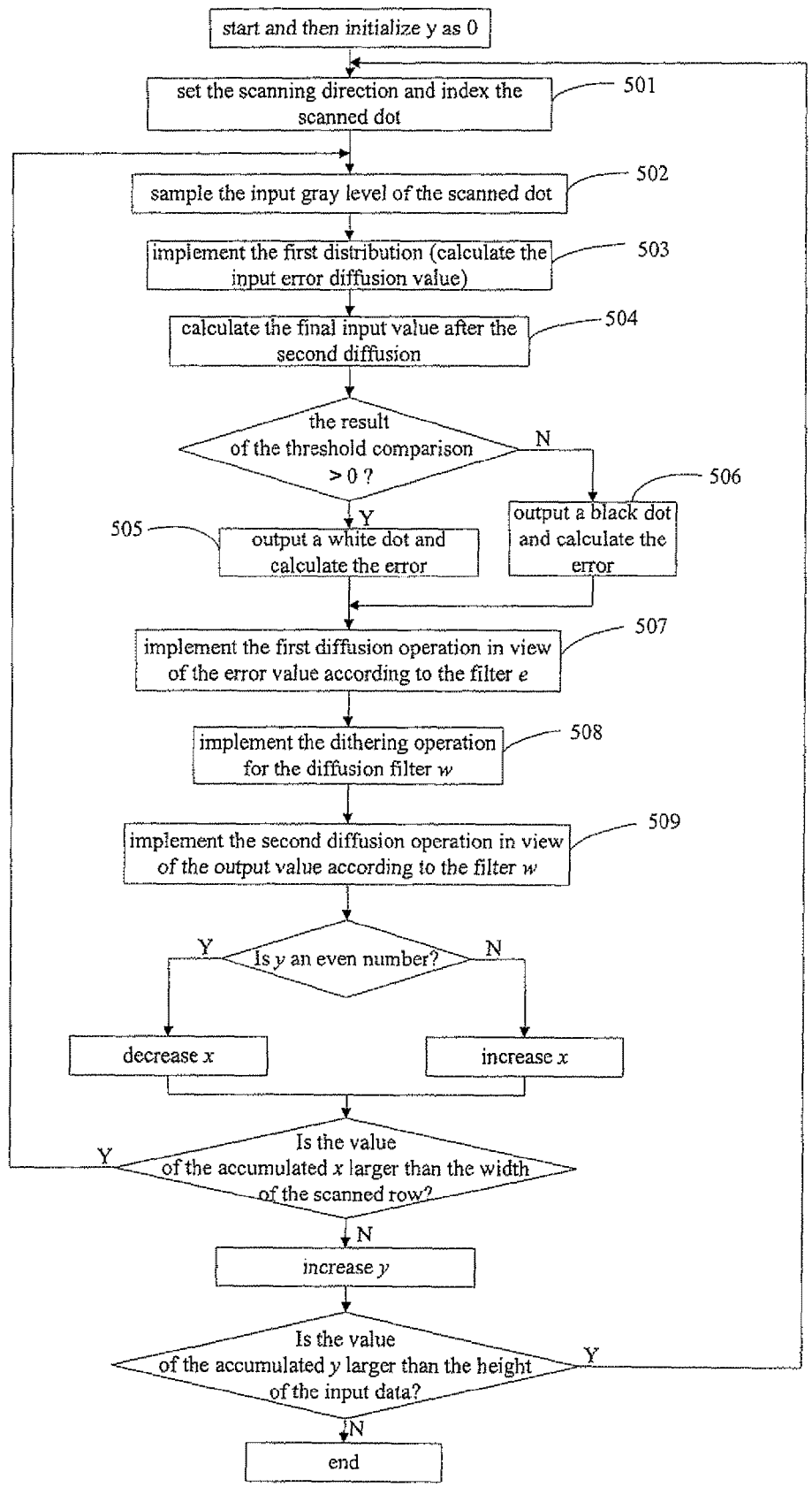
FIG. 5 is a flowchart of error diffusion based on dual-feedback.

FIG. 4 shows the halftone effects of different gradations, which are generated by implementing the steps mentioned above to an image. Comparing with the FIG. 4, FIG. 3 shows the effects of a frequency-modulation screen based on error diffusion. By comparing the two figures, it can be seen that the frequencies of the halftone dots shown in FIG. 4 include not only the simplified components of high frequency and low frequency in the prior frequency-modulation screen but also the component of medium frequency between the high frequency and low frequency because the size of the dots can be changed regularly so that the conventional frequency-modulation screen has the characteristic of the amplitude-modulation screen FIG. 5 shows a flowchart implementing the steps mentioned above and related algorithms. In step 501, the direction for scanning data is set and the data index (x, y) of the current scanned dot is sampled according to the following equation:

$x=(y\%2)\times(\text{Sample Width}-1)$.

In step 502, the value iSample of the pixel at the scanned dot is sampled according to the index (x, y). In step 503, the input error diffusion value iError_Err is calculated according to the following equation:

$i\text{Error}\_Err=i\text{Sample}+lp\text{CurLine}_x$ wherein, an accumulated value of error diffusion from the preceding pixels to the current pixel is stored in lpCurLine$_x$. Then, in step 504; the second diffusion and accumulation are implemented so that the final input value iError of the pixel is obtained by using the following equation:

$i\text{Error}=i\text{Error}\_Err+lpW\text{CurLine}_x$ wherein, the accumulated value of the second diffusion from the preceding pixels to the current pixel is stored in lpWCurLine$_x$. After a threshold comparison operation, white dot is output in step 505 or black dot is output in step 506. The output value of the white dot is 255 (i.e. output=255) and the error between the input and output iError_Err=iError_Err−255. On the other hand, the output value of the white dot is 0 (i.e. output=0) and the corresponding error value is still iError_Err. In step 507, the subsequent error diffusion operation is implemented according to the weight distribution coefficients in the error diffusion filter e according to the following equation:

$$lpCurLine_{x+i} = llpCurLine_{x+i} + iError\_Err \times e_i$$

wherein, i represents the diffused position and $e_i$ represents the error diffusion coefficient at the position. In step 508, a dithering operation is implemented for the diffusion filter w according to the Formula 1. In step 509, the second diffusion is processed for the output value OutPut according to the diffusion filter w after dithering operation. The diffusion operation is implemented according to the following equation:

$$lpWCurLine_{x+i} = lpWCurLine_{x+i} + OutPut \times w_i$$

wherein, i represents the diffused position and $w_i$ represents the diffusion coefficient at the position. Then, the rest may be deduced by analogy and all of the scanned input data may be processed finally.

The present invention is not limited to the embodiments mentioned above. Other embodiments obtained by the skilled in the art according to the technical solutions in the present invention should be within the scope of the technical innovation of the present invention.

The invention claimed:

1. A processor implemented method for frequency-modulation screening using error diffusion based on dual-feedback, comprising:
   (1) carrying out an operation T of threshold comparison in view of a final input value g"(m, n) of a pixel of an original image by a processor, wherein a result of the operation is converted to a corresponding value b(m, n) that a printer is responsive to for generating a corresponding pixel of a halftone image;
   (2) comparing the value b(m, n) of the pixel with a input value g'(m, n) of the same pixel by the processor to obtain a difference between b(m, n) and g'(m, n), wherein the difference is an error value e(m, n), the input value g'(m, n) is used for the operation T of threshold comparison;
   (3) multiplying the error value e(m, n) by preset weight distribution coefficients of an error diffusion filter e and then diffusing a result to unprocessed pixels around a current pixel by the processor, wherein a diffused error value to a pixel is weightedly added to a value g(m, n) of the pixel of the original image to obtain a new input value g'(m, n) of the pixel of the original image;
   (4) diffusing processed results to surrounding corresponding unprocessed pixels, and weightedly adding each of the diffused results and each of parameters of error diffusion in the steps (2) and (3) to the input value g(m, n) of the pixel of the original image by the processor to obtain the final input value g"(m, n) of the pixel, wherein the processed results are obtained by implementing a multiplying operation in view of the output value b(m, n) of the current processed pixel using a diffusion filter w which has been processed with a dithering algorithm, and the step (4) is a parallel operation of the steps (2) and (3);
   (5) repeating the steps (1)-(4) until the input values g(m, n) of all pixels are processed.

2. The method as defined in claim 1, wherein the step (1) uses a process of bidirectional scanning when the original image is scanned, for each of continuously scanned rows in the original image, if a certain row is scanned from left to right, a next row is subsequently scanned from right to left, and a rest is deduced by analogy until all of the rows are scanned completely.

3. The method as defined in claim 1 or 2, wherein the error diffusion filter e in the step (3) uses the following principle of diffusion and weight distribution mode:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the position of the current pixel, each of the arithmetic ratios on the other positions represents the diffusion weight coefficient relative to the current pixel, and the diffusion weight coefficients belong to [0, 1] and satisfy the following expression:

$$2 \times d_1 + 4 \times d_2 + 2 \times d_3 + 2 \times d_4 + 2 \times d_5 \in [0,1].$$

4. The method as defined in claim 1 or 2, wherein a diffusion mode of the diffusion filter w in the step (4) is set as:

|       | **    | $w_0$ |
|-------|-------|-------|
| $w_3$ | $w_2$ | $w_1$ | wherein, a scanning direction is from left to right, ** represents the position of the current pixel, each of the parameters on the other positions represents the diffusion weight coefficient relative to the current pixel, and the parameters belong to [0, 1] and satisfy the following expression:

$$w_{sum} = (w_0 + w_1 + w_2 + w_3) \in [0,1].$$

5. The method as defined in claim 3, wherein a diffusion mode of the diffusion filter w in the step (4) is set as:

|       | **    | $w_0$ |
|-------|-------|-------|
| $w_3$ | $w_2$ | $w_1$ | wherein, a scanning direction is from left to right, ** represents the position of the current pixel, each of the parameters on the other positions represents the diffusion weight coefficient relative to the current pixel, and the parameters belong to [0, 1] and satisfy the following expression:

$$w_{sum} = (w_0 + w_1 + w_2 + w_3) \in [0,1].$$

6. The method as defined in claim 1 or 2, wherein the dithering algorithm for the diffusion filter w uses the following processes:

$$fRand = (R(m,n)/R\_MAX - 0.5) \times cDither$$

$$dw_0 = w_0 - fRand$$

$$dw_2 = w_2 + fRand$$

$dw_1 = w_1 + f\text{Rand}$ $dw_3 = w_3 - f\text{Rand}$ wherein, fRand is a parameter for fine adjusting dithering; R(m, n) is a parameter with random value for a current dot being scanned; R_MAX is a maximum of a random parameter R(i); cDither is a parameter for adjusting amplitude of dithering; and $dw_0 \sim dw_3$ are the diffusion weight coefficients of the diffusion filter w in different directions after dithering.

7. The method as defined in claim 5, wherein the dithering algorithm for the diffusion filter w uses the following processes:

$f\text{Rand} = (R(m,n)/R\_MAX - 0.5) \times c\text{Dither}$ $dw_0 = w_0 - f\text{Rand}$ $dw_2 = w_2 + f\text{Rand}$ $dw_1 = w_1 + f\text{Rand}$ $dw_3 = w_3 - f\text{Rand}$ wherein, fRand is a parameter for fine adjusting dithering; R(m, n) is a parameter with random value for a current dot being scanned; R_MAX is a maximum of a random parameter R(i); cDither is a parameter for adjusting amplitude of dithering; and $dw_0 \sim dw_3$ are the diffusion weight coefficients of the diffusion filter w in different directions after dithering.

* * * * *